E. ATKINSON.
EARTH-SCRAPER.

No. 178,831. Patented June 20, 1876.

UNITED STATES PATENT OFFICE.

EMPSON ATKINSON, OF WOODSTOWN, NEW JERSEY.

IMPROVEMENT IN EARTH-SCRAPERS.

Specification forming part of Letters Patent No. 178,831, dated June 20, 1876; application filed May 2, 1876.

*To all whom it may concern:*

Be it known that I, EMPSON ATKINSON, of Woodstown, in the county of Salem and State of New Jersey, have invented a new and useful Improvement in Earth-Scrapers, which improvement is fully set forth in the following specification, reference being had to the accompanying drawings, in which—

Figure 1:
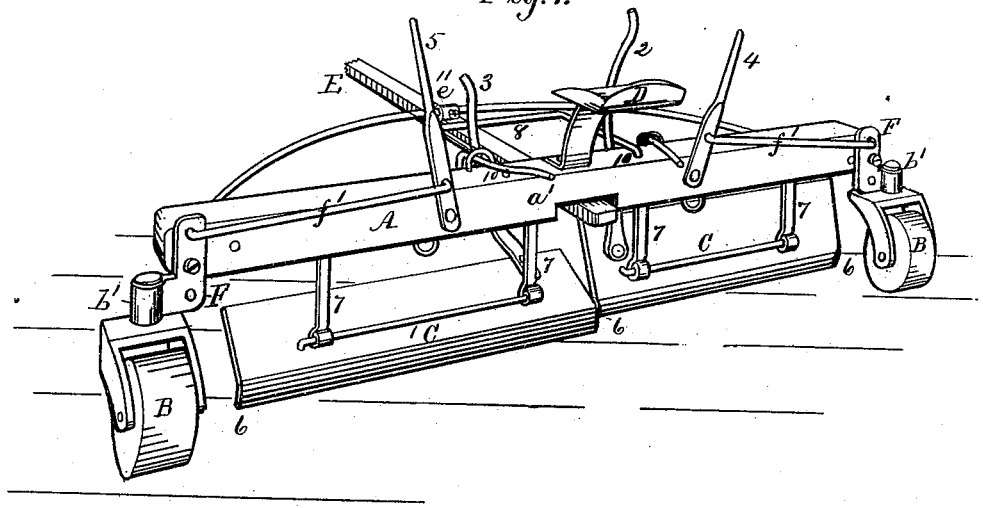
Figure 2:
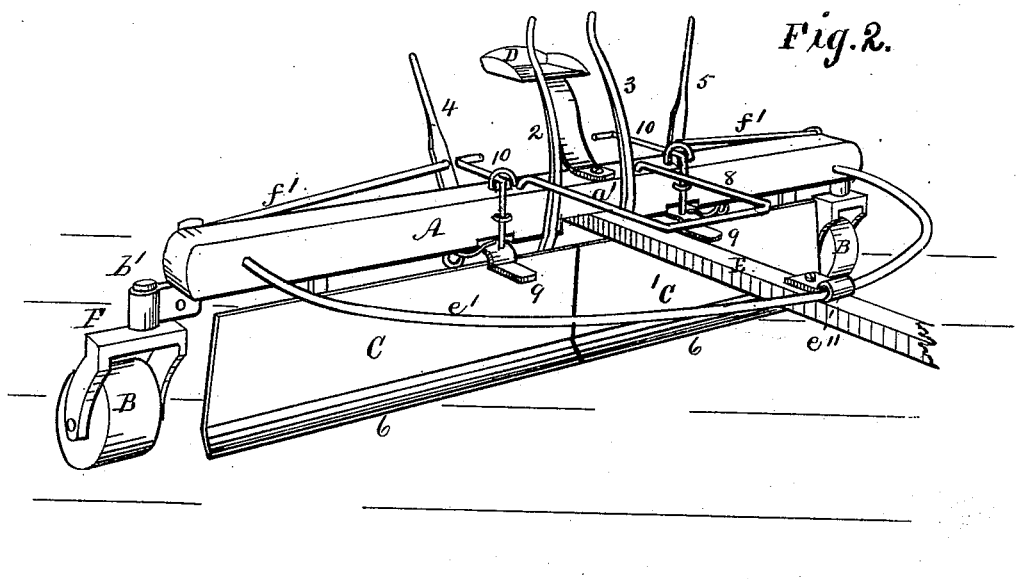

Figure 1 is a perspective view of the rear end of my said improved scraper with the left-hand scraper-plate tilted upward; and Fig. 2, a perspective view of the same implement in front, with both of the scraper-plates in their proper vertical scraping positions.

The object of my improvement is to afford a more easily-managed and effective earth-scraper by constructing the same with two separably-operating scraper-plates, suspended from a frame provided with a caster-wheel at each end, which can be raised or lowered to suit the required lowered or raised positions of the frame, and the requisite changes in the positions of the scraper-plates, by means of respective hand-levers within convenient reach of the driver while riding in an appropriate seat fixed on the top of the implement, as will hereinafter be explained.

Referring to the drawings, A is the frame; B B, the caster-wheels; C C', the two scraper-plates; 2 and 3, the hand-levers, attached to the plates C C', respectively; 4 and 5, the hand-levers for raising and lowering the caster-wheels, respectively; D, the driver's seat; E, the draft-pole, and $e'$ a semicircular brace-bar for keeping the pole E in the same horizontal plane with the under side of the frame A as the said pole may be moved to the right or left in driving, and turning the implement around either to the right or left. The frame A consists of a strong, straight beam of wood, of rectangular transverse section, and in a recess, $a'$, in the middle of the under side of said beam the inner end of the pole E is secured by a vertically-fixed bolt, so as to allow the pole to be swayed to right and left by the draft-animals (not shown) on turning the implement in such directions during its progress, the semicircular bar $e'$ being fixed rigidly by its ends to the beam A, so as to be concentric to the bolt in the recess $a'$, and the upper side of the pole E secured to the bar $e'$ by an eye or loop, $e''$, so as to keep the said pole in the same horizontal plane during its swaying movements. The caster-wheels B B have their respective pintles $b'$ $b'$ secured each in a socket of the lower arm of an L-lever, F, pivoted in a vertical position to each end of the beam A, and the upright arm of each lever connected by a rigid bar, $f'$, to the respective hand-levers 4 and 5, so that the driver, when seated on D, can readily raise and lower the caster-wheels, or either of them, in relation to the ground, as occasion may from time to time require, as will be hereinafter more fully explained. The scrapers C and C' are of equal lengths and widths, of plate-iron, cut into oblongs of such lengths and widths, respectively, as, when abutted together and supported vertically between the beam A and the level ground, upon which the implement rests by its caster-wheels B B, to nearly fill the space between the said beam and ground and the two wheels, substantially as indicated in Fig. 2. The plates C C' are each perfectly flat, with the exception of a forward band, 6 6, along their respective lower edges at angles of about forty-five degrees, the lower edges being sharpened. Each plate C C' is supported by two strong eyebolts, 7 7, which are fixed into the under side of the beam A, so as to project vertically downward nearly to the lower edge of the plate, and to the rear side of the latter the eye ends of the said bolts are jointed, so that the plate may be tilted forward to the inclined position shown in plate C', Fig. 1, or brought up to the vertical position shown by C in both the figures.

The required changes in the positions of the said plates C and C' are effected by means of the respective hand-levers 2 and 3, the lower ends of which are riveted fast to the rear sides of the plates, respectively, so as to project upward in front of the beam A to within convenient reach of the driver, in either the vertical or tilted positions of the said scraper-plates, substantially as shown in the drawings. A stop-bar, 8, which projects horizontally from the beam and in front of the seat D, serves to prevent the hand-levers 2 and 3 from being pushed forward too far.

When the plates C C', or either of them, are in their vertical positions, they are each held by a spring-catch, 9, fixed to the under side of the beam just above the upper edge of each plate, which automatically catches over the edge of the plate and holds it, with the lever 2 or 3 bearing against the front of the beam A. Attached to each of the spring-catches 9 9 is a foot-lever, 10, whereby the driver can lift the said catches by placing his foot upon them whenever he wishes to tilt the plates C C'.

Operation: Supposing the implement to be supported on its two wheels B B, and the two scraper-plates C C' in their vertical positions, as shown in Fig. 2, and drawn forward by the animals, guided by the driver in the seat D, the lower edges of the plates C C' will be in the same plane with the wheels B B, and scrape close to the surface, if the ground be level, and thus the loosened earth carried forward, and any little protuberances on the ground cut off at the same time by the inclined sharp edges of the plates C C', and carried forward until the accumulations are sufficient to be left behind, when the driver places his feet upon the foot-levers 10, thus raising the spring-catches 9 out of contact with the plates C C', and taking hold of the two levers 2 and 3, he pushes them forward against the stop-bar 8, and thus tilts forward both of the plates C C', and leaves the accumulated earth behind, and then immediately draws the two levers back to their original nearly vertical positions, where they are held by the spring-catches 9 9, as shown in Fig. 2. The tilted position of the plates is shown by one of them, C', in Fig. 1, and this tilted position of either of the plates C or C' may be taken at any time during the progress of the implement, to avoid immovable obstructions — as low stumps or stones—or if only one of the two plates requires to be used in removing earth.

In conveying the implement to or from the place of work, both plates are to be tilted forward; and if it be desired to cause the plates to cut into the solid ground, the driver draws toward himself the two hand-levers 4 and 5, and thus tilts outward and upward the two caster-wheels B B, and thus throws the whole weight of the implement and driver upon the cutting-edges of the two plates C C'.

In turning the implement to right or left, the pole E slides, accordingly, in close contact with the semicircular bar $e'$, and thus facilitates the turning of the implement without any danger of breaking off the said pole.

I claim as my invention—

1. The combination of the pintles $b'$ $b'$ of the caster-wheels B B with the L-levers F F, connecting-bars $f'$ $f'$, levers 4 and 5, and frame A, substantially as described.

2. The flat, oblong, plate-metal scraper-plates C C', constructed in two lengths, with the respective inclined or forward-projecting edges 6 6, and suspended from the beam or frame A by the fixed bars 7 7, substantially as described, in combination with the respective hand-levers 2 and 3, and their retaining spring-catches 9 9, and foot-levers 10 10 on the frame A.

EMPSON ATKINSON.

Witnesses:
BENJ. MORISON,
MAHLON D. DICKINSON,
SALLIE C. DICKINSON.